P. D. BREWSTER.
APPARATUS FOR PRINTING CINEMATOGRAPHIC FILMS.
APPLICATION FILED MAY 1, 1915.
1,233,176.
Patented July 10, 1917.
3 SHEETS—SHEET 2.
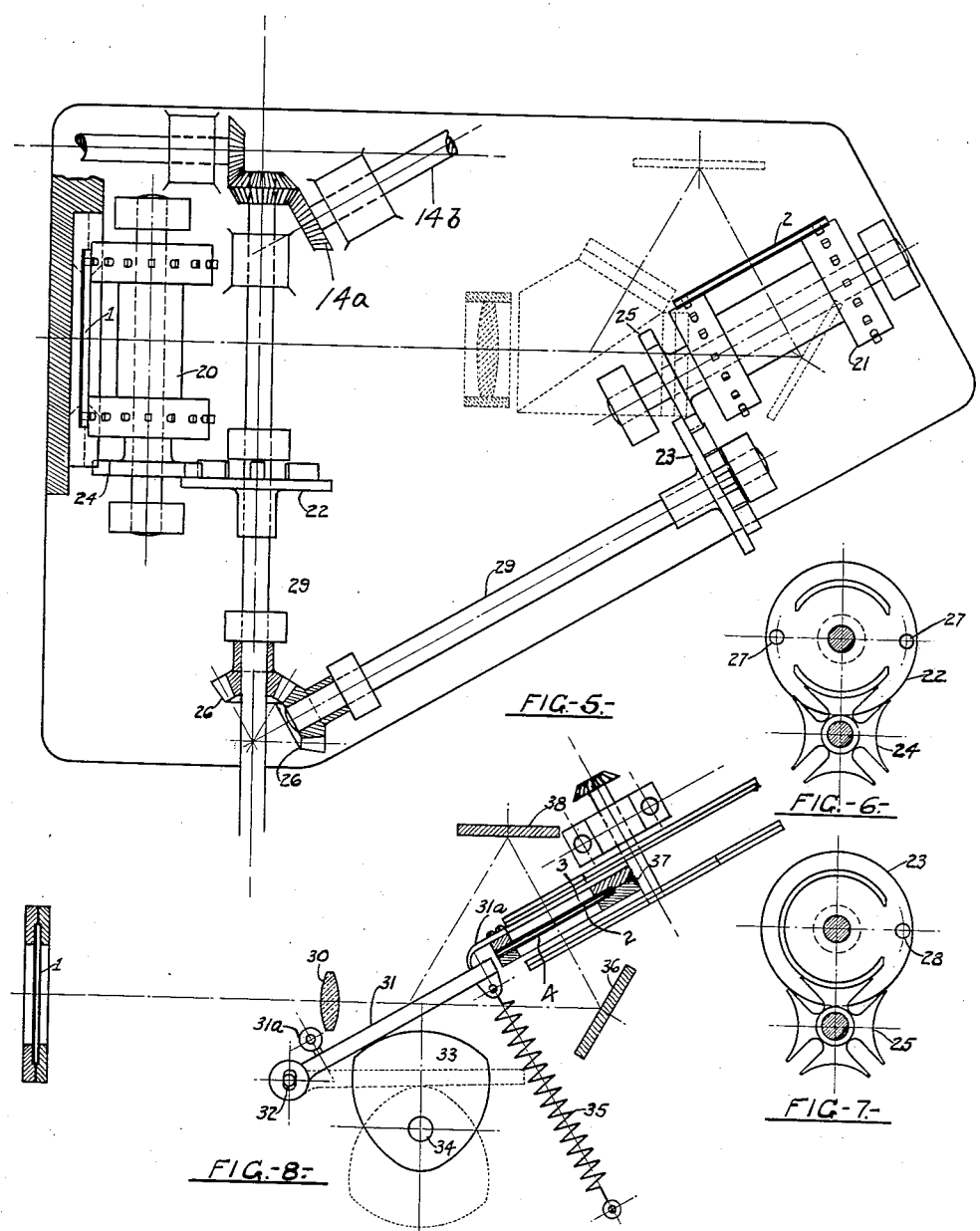
WITNESSES:
INVENTOR
P. D. Brewster
BY
his ATTORNEYS

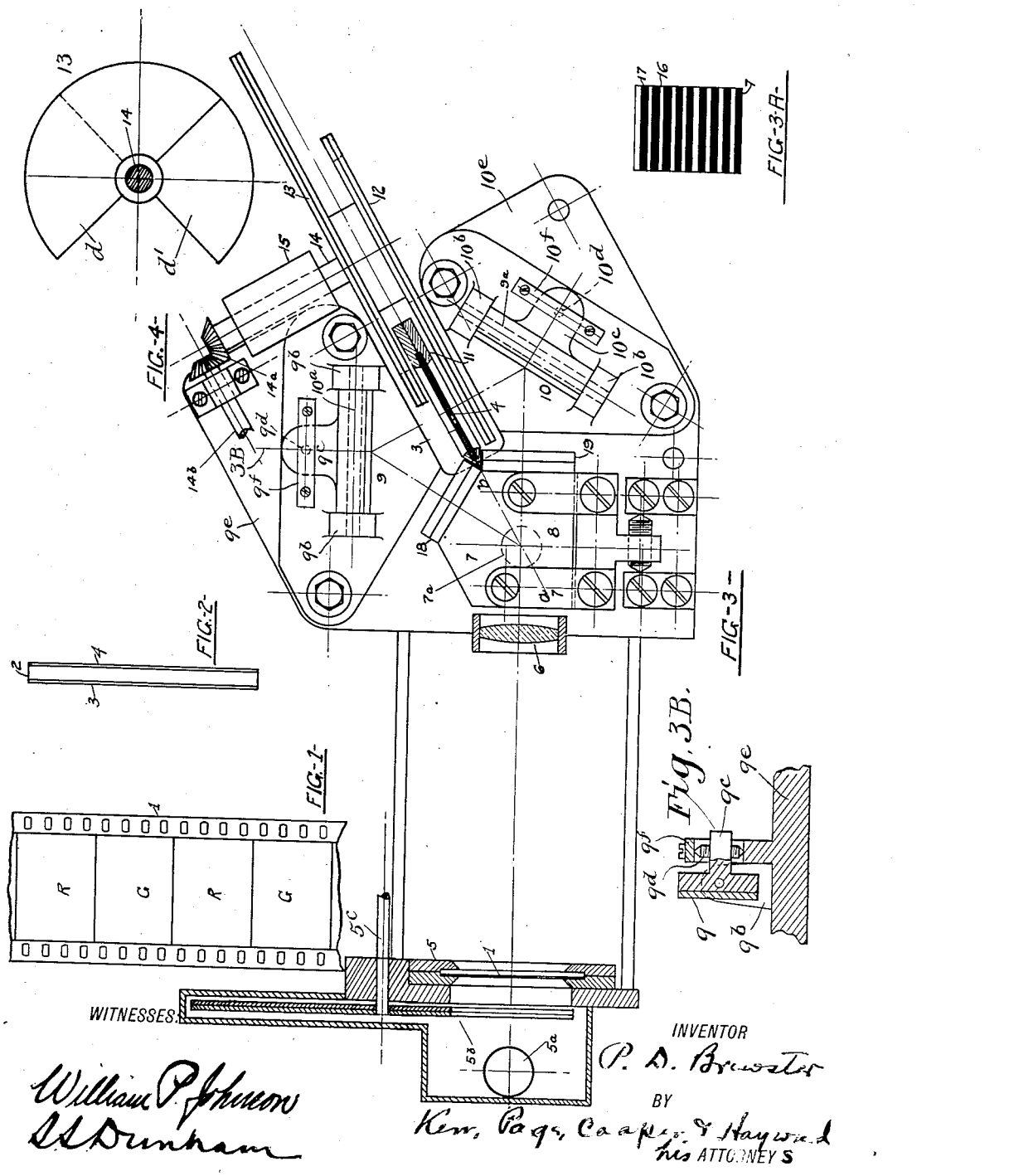

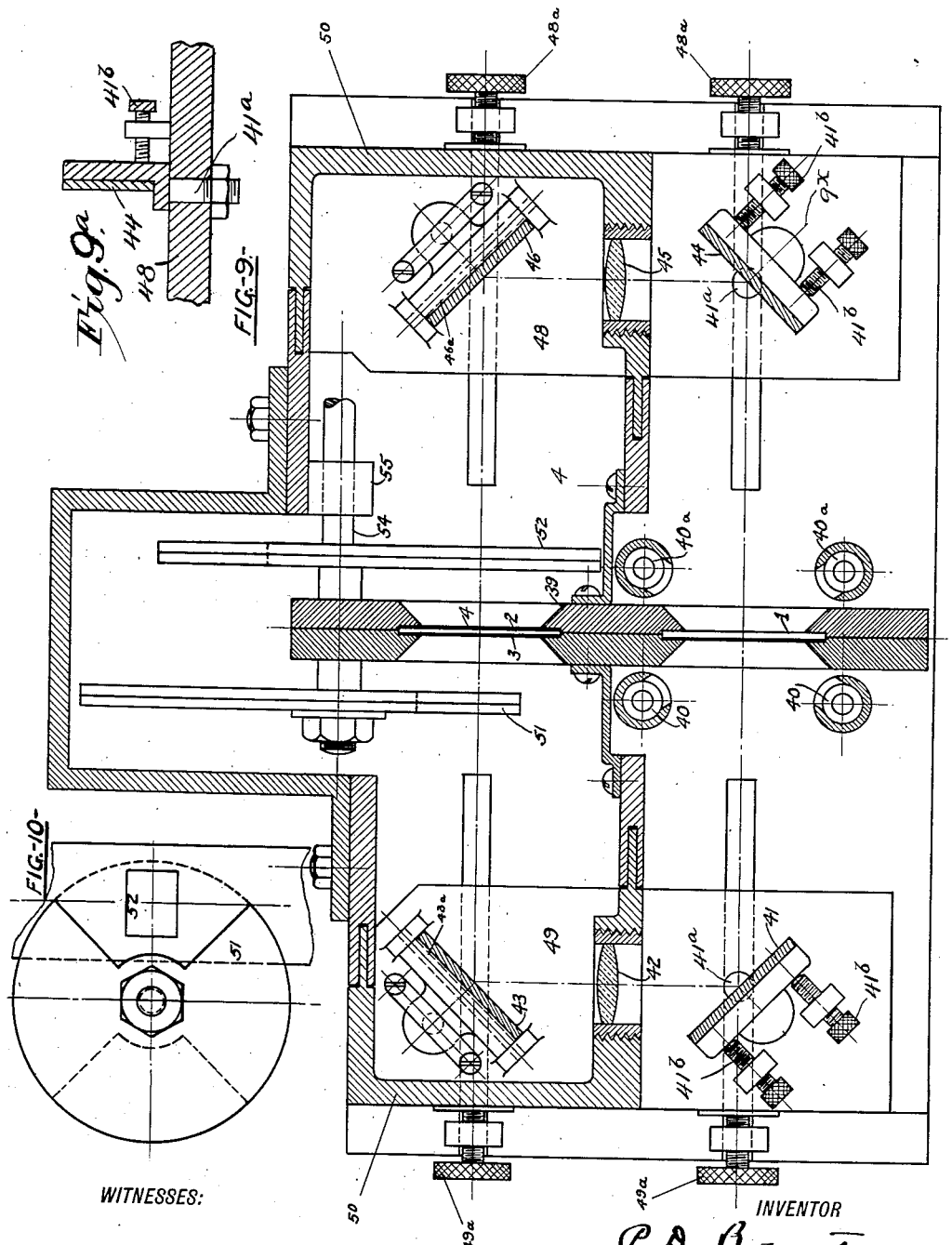

UNITED STATES PATENT OFFICE.

PERCY DOUGLAS BREWSTER, OF EAST ORANGE, NEW JERSEY.

APPARATUS FOR PRINTING CINEMATOGRAPHIC FILMS.

1,233,176.

Specification of Letters Patent.

Patented July 10, 1917.

Application filed May 1, 1915. Serial No. 25,113.

*To all whom it may concern:*

Be it known that I, PERCY D. BREWSTER, a citizen of the United States, residing at East Orange, county of Essex, and State of New Jersey, have invented certain new and useful Improvements in Apparatus for Printing Cinematographic Films, of which the following is a full, clear, and exact description.

The invention which forms the subject of the present application relates to printing on the two sides of a cinematographic film from a negative having two series of images taken through differently colored filters, as for example one series through a red and the other through a green filter. The two series of negative images are preferably on the same side of the negative film but with the images of one series in alternation with those of the other; that is, designating the images by the color of the filters through which they were produced, each "red" image is followed by a "green" image, and vice versa. The invention is not, however, limited to the alternate arrangement, for the two series of images may be side by side, but the latter arrangement requires (as will be readily understood from the subjoined description by persons skilled in the art) that the negative, or the positive, film be shifted laterally as well as longitudinally whereas the alternate arrangement requires only longitudinal movement of the films, with correspondingly simpler printing apparatus and less liability of errors in securing suitable "registration" of the "red" and "green" positive images, which, it will be understood, are not in alternation but are, so to speak, superposed one on the other.

The method of exposing the negative film in the taking camara is to a certain extent immaterial. For example, "red" and "green" exposures can be made in alternation, as in the so-called "kinemacolor" process, or they can be made simultaneously as by splitting the light from the lens.

Two forms of the invention are illustrated in the accompanying drawings, in which—

Figure 1 shows a piece of negative film having alternating images, taken through differently colored filters. In this figure the two filters are assumed to be red and green, as usual, and the corresponding images are designated by the letters R and G, respectively.

Fig. 2 is an edgewise view of a portion of the positive film, composed of a transparent base or support 2 with sensitive coatings or emulsions, 3, 4, on its two sides.

Fig. 3 is a plan view, partly in horizontal section, of the preferred form of printing apparatus, or "printer." In this apparatus the negative images are projected upon the positive films by means of a lens, the light from the latter being split and reflected, part to one side and part to the other side of the positive film.

Fig. 3$^A$ is a plan view of the reflecting surface of a "splitting prism" suitable for use in a printer of the type illustrated in Fig. 3.

Fig. 3$^B$ is a detail section on line 1$^a$ of Fig. 1.

Fig. 4 is an elevation of one of the two shutters used in Fig. 3.

Fig. 5 is a plan view of the film-feeding mechanism by which the two films are fed through the machine in proper relation to each other.

Figs. 6 and 7 are detailed views of two Geneva movements used in the feed-mechanism, one for the negative and one for the positive.

Fig. 8 is a diagrammatic plan view illustrating a one-lens printer in which the light is in effect split, but by reflecting it all first to one side and then to the other side of the positive film; using for the purpose a mirror which is swung into and out of the path of the rays from the lens.

Fig. 9 is a sectional plan view of a two-lens printer, of the type shown in my copending applications Ser. Nos. 870,754, and 23,025.

Fig. 9$^a$ is a detail section on line 9$^x$ of Fig. 9, illustrating the adjustable mounting of two of the mirrors therein shown.

Fig. 10 is an elevation of the shutter used in Fig. 9.

The negative, illustrated in Fig. 1 as having images R taken through a red filter and, in alternation therewith, images G taken through a green filter, is fed intermittently through a negative filmgate 5, Fig. 3, and is illuminated in any convenient manner. If the film is of the "opaque" type, as described in my copending application Ser. No. 13,595, the film is illuminated on the front and the light is reflected therefrom to the lens; but I prefer the negative to be transparent, in which case it is illuminated from the rear, as by means of a lamp $5^a$. The light from the negative is received by the lens 6 and projected into the splitting device 7—8 adapted to divide the light into two parts, one part reflected by the silver bands or bars 17 on the rear surface $a$—$b$ of prism 7 and thence to a mirror 9 by which it is reflected to the emulsion 3 on the positive film 2; while the other part is transmitted by the clear spaces 16 between the silver bands, and through the other prism, 8, to the mirror 10 by which it is reflected to the emulsion 4 on the positive film in the positive filmgate 11. It will be readily understood that with the lens and the transmitting reflecting devices properly positioned the two images thus projected will be complete and will have any desired degree of accuracy of registration on the positive film. To get the desired degree of accuracy in registration the images can be shifted horizontally by turning the prism 7—8 on its vertical center-pin $7^a$, and vertically by tilting the reflectors 9, 10, on their horizontal axes. For this purpose the reflectors are mounted on pins or shafts $9^a$, $10^a$, Figs. 3 and $3^B$, which are in turn mounted in the standards $9^b$, $10^b$, while the arms $9^c$, $10^c$, are provided with capstan screws $9^d$, $10^d$, working between the base-plates $9^e$, $10^e$, and the upper plates $9^f$, $10^f$.

The negative images being in alternation, as indicated in Fig. 1, the "red" and "green" images cannot, in the printer illustrated, be projected on the positive film simultaneously. Instead, one negative image, say a "red," is projected, and the negative moved one step. Then the "green" image is projected, after which both films are moved one step, thereby bringing the next "red" image on the negative and an unexposed space on the positive into position. In other words, the negative film moves two steps while the positive moves one. For this purpose suitable feed-mechanism is provided, preferably as illustrated in Fig. 5, where 20 and 21 are two sprockets, of the usual type, coöperating with the usual perforations or sprocket holes at the edges of the negative and positive films respectively. On the shaft of the sprocket 20 is a Geneva star-wheel or Maltese cross 24 (see also Fig. 6) actuated by a pin-wheel 22 having two pins, 27, at diametrically opposite points, so that the star-wheel or cross will be actuated twice in each revolution of the pin wheel. The positive sprocket shaft is equipped with a similar star-wheel or cross 25, driven by a pin-wheel 23 having a single pin 28. Hence the cross 25 is actuated but once in each revolution of its pin-wheel. The two pin-wheels are mounted on the shafts 29, $29^a$ connected by bevel gears 26 so as to rotate in unison at the same speed. One of the shafts, as 29, can be extended past the bevel gearing for connection with suitable driving mechanism, not shown.

The exposure of the positive film is controlled by rotary shutters 12, 13, of the disk type on opposite sides of the film gate 11 and carried by the shaft 14 mounted in a bearing 15. The shaft is rotated in any convenient way, as by the shaft 29, Fig. 3 through bevel gearing $14^a$ and shaft $14^b$. Each shutter is composed of two disks $d$, $d'$, Fig. 4, of about 180° extent, more or less, and capable of relative rotary adjustment on the shaft 14 to vary the angular width of the sector-shaped exposure opening and thereby varying the duration of the exposure. The shutters are arranged with the exposure openings diametrically opposite each other, so that the two sides of the film will be exposed in alternation and they are so arranged that the exposures occur only when the two films are at rest, as will be readily understood.

In conjunction with the shutters 12, 13, I may provide a shutter, as $5^b$, to intercept the printing light while either film is in motion. This shutter may be like 12 (or 13), and connected to shaft 29, Fig. 5, by a shaft $5^c$ and bevel gearing (not shown), to rotate at the proper rate.

The operation of the printer will now be readily understood. Both films, being at rest, one of the images on the negative film 1, for example one of the R images, is projected upon the emulsion 3 of the positive film through the sector-shaped exposure opening in shutter 13, shutter 12 being in the path of the rays from mirror 10 and hence preventing projection of the image upon emulsion 2. The shutters being in motion, exposure of emulsion 3 is ended, whereupon the negative film is shifted one image-space, bringing a G image to the film gate 5, after which the exposure opening in shutter 12 reaches the film gate 11 and exposes emulsion 4. When this exposure is ended and while both sides of the positive film are protected by the shutters both films are shifted one image-space, bringing the next R image of the negative to the film gate 5 and an unexposed portion of the positive to the film gate 11. The cycle thus described is repeated as often as necessary. It will be understood that when the shutter $5^b$ is used, the printing light is cut off while either film is in motion.

The exposed positive film is now developed and fixed on both sides, after which the two sides are colored, each in a color different from the other, the two colors being selected to give a good rendering of the colors of the object photographed when the images on the two sides of the film are viewed simultaneously by transmitted light.

Usually the positive images made from the negative images which were taken through a green filter are colored red, and the others, made from the negative images taken through a red filter, are colored green. The coloring may be effected by the well known Traube process or by the Miller method. In the preferred way of practising the Miller process the silver of the photographic image is "bleached" by conversion into a hydrosol of silver iodid by means of iodin in a solution of potassium iodid, after which the two sides of the film are treated with dyes (usually basic) of the proper colors. Upon washing the film the dyes are retained by the hydrosol but are washed out of the gelatin elsewhere, thus leaving dye-images which are more or less transparent according to the extent to which the original silver of the image was converted into the hydrosol. This factor is easily regulated, as by varying the strength of the bleaching solution.

By making both Geneva pin-wheels alike, as for example both like wheel 23, so that the two films will be fed equally instead of the negative faster than the positive, the printer can be used with negatives in which the two series of images are on opposite sides of the film and in registry with each other, as in my copending applications Ser. Nos. 870,754, and 747,712. The shutters 12, 13 can then be omitted if desired and shutter 5$^b$ relied upon to prevent light striking the positive while the two films are in motion. The negative images on one side of the negative are in one color, for example red, and in another color, for example green, on the other side. Behind the splitting prism light filters 18, 19, are provided, one green and the other red, so that one side of the positive will receive only rays above, say, yellow of the spectrum, and the other only rays below green; or, if the filters are omitted, the emulsions on the positive are sensitized (as by well understood methods) so as to be affected only by rays of the proper color, as for instance on one side by rays above yellow and on the other by rays below green. With the filters in use the positive emulsions can be sensitized to the proper rays, as indicated, or both can be panchromatically sensitive. Of course the filters can also be used in printing from negatives of the "kinemacolor" type as already described, the positive emulsions being sensitive to the rays passed by the filters.

Another one-lens printer is illustrated diagrammatically in Fig. 8. Here the rays from the negative film 1 are projected by the lens 30 and reflected by mirrors 31, 38 to the emulsion 3 of the positive film 2 in film gate 37. Shutter 3$^a$ now obscures emulsion 3, after which the negative film is shifted one step (by feed mechanism like that illustrated in Fig. 5) and the rotating cam 33 on shaft 34, which has been holding the swinging mirror 31, pivoted at 32, against the stops 31$^a$, permits the spring 35 to swing the mirror out of the path of the rays so that the latter reach the mirror 36. The exposure opening in shutter 4$^a$ then reaches the film gate and exposes the emulsion 3. This exposure ended, both films are shifted one step, the cam 33 (suitably connected with the feed mechanism in any convenient manner, not shown) swings the mirror back to its former position, and the shutter 3$^a$ exposes emulsion 3. This completes one cycle of operation.

In the two-lens printer shown in Fig. 9 the films, 1, 2, are fed through the double film gate 39 by mechanism like that shown in Fig. 5, so that the negative film is shifted two steps to one of the positive. The negative is illuminated by lamps 40, 40$^a$. The rays from the negative are received by the mirrors 41, 44, and are projected by the lenses 42, 45 to the mirrors 43, 46, whence they are reflected to the emulsions 3, 4, on the positive film 2. The lenses, the axes of which are parallel to the plane of the films, are adjustably mounted in the wall of the housing, as by means of screw threads, for focusing purposes. For the same purpose the mirrors are mounted on sliding bases 48, 49, shifted by means of adjusting screws 48$^a$, 49$^a$. The housing-wings 50 are mounted on the sliding bases and are connected to the main housing by the tongue-and-groove construction shown to permit them to move with the bases without leakage of light into the housing. The desired registration of the images on the two sides of the positive film is produced by tilting the mirrors 41, 44 on their vertical pivots 41$^a$, 44$^a$, and the mirrors 43, 46 on their horizontal pivots 43$^a$, 46$^a$, as will be readily understood. For this purpose mirrors 43 and 46 are mounted as mirrors 9 and 10 (see Fig. 3$^B$, which illustrates the adjustable mounting), while mirrors 41 and 44 are mounted on vertical pins 41 in the base-plates 48, 49. Screws 41$^b$, on each side, enable the mirror to be tilted sidewise in either direction with extreme accuracy. The shutters 51, 52 have their sector-shaped exposure openings diametrically opposite each other, as in the case of the corresponding shutters in Figs. 3 and 8. When shutter 52 is closed the other is open, and an image is projected upon emulsion 3. Then shutter 51 closes and the negative film 1 is advanced one image-space, after which shutter 52 opens and exposes emulsion 2. As soon as shutter 52 closes, and before shutter 51 opens again, both films are advanced one image-space, whereupon shutter 51 opens and exposes emulsion 3. This completes one cycle of operation. The lamps 40$^a$ may be extinguished while emulsion 4 of the positive film is being exposed, and lamps 40 extinguished while emulsion 3 is being exposed so that only rays transmitted through the negative are projected upon the positive. Or shutters like 51 and 52 can be provided between the negative film and the lamps, for the same purpose.

The structure shown in Fig. 9 is described and claimed in my copending applications Ser. Nos. 870,754, filed Nov. 7, 1914, and 23,025, filed April 22, 1915, while the one-lens printer illustrated in Fig. 3 is similar to that described in my copending application Ser. No. 815,153.

Ordinarily the emulsions on the positive are sufficiently opaque, considering the usually short duration of the exposures, to prevent the passage of light through one emulsion in such amount as to affect the other. But if such "interference" should occur it can easily be prevented, as by sensitizing one side of the positive to one color, say red, and the other side to another color, as green; and then illuminating the negative with red light and green light in alternation, as by interposing red and green filters between the negative and the source of light, or alternate negative images (high lights included) can be stained red and the others green.

It is to be understood that the invention is not limited to the devices herein specifically shown and described but can be embodied in other forms without departure from its spirit.

I claim:

1. In a photographic printing apparatus for the purpose described, the combination of positive and negative film gates, means for projecting images from a film in the negative film gate upon opposite sides of a film in the positive film gate, and step-by-step film-feeding mechanism adapted to advance the negative film two image-spaces and the positive film one image-space in each cycle of operation.

2. In a photographic printing apparatus for the purpose described, the combination of positive and negative film gates, means for projecting upon the opposite sides of a film in the positive film gate images from a film in the negative film gate while both films are at rest, and step-by-step film-feeding mechanism having means to advance the negative film two image-spaces and the positive film one image-space in each cycle of operation.

3. In a photographic printing apparatus for the purpose described, the combination of positive and negative film gates, means for projecting images from a film in the negative film gate upon opposite sides of a film in the positive film gate, shutters arranged to expose the opposite sides of the positive film alternately, and step-by-step film-feeding devices operating while both sides of the positive film are obscured and adapted to advance the negative film two image-spaces to one image-space of the positive.

4. In a photographic printing apparatus for the purpose described, the combination of positive and negative film gates, means for projecting images from a film in the negative film gate upon opposite sides of a film in the positive film gate, means for feeding a film step by step through the negative film gate, means for feeding a film in the positive film gate one step at each alternate step of the film in the negative film gate, and means to expose the film in the positive film gate only while both films are at rest.

5. In a photographic printing apparatus for the purpose described, the combination of positive and negative film gates, means for projecting upon opposite sides of a film in the positive film gate images from a film in the other, feed-sprockets for feeding the films through the film gates, means for actuating intermittently the negative film feed-sprocket, and a Geneva movement connected with said means and with the positive film feed-sprocket to actuate the latter at each alternate actuation of the other sprocket.

6. In a photographic printing apparatus for the purpose described, the combination of positive and negative film gates, means for projecting alternately upon opposite sides of a film in the positive film gate images from a film in the negative film gate, and Geneva-movement film-feeding mechanism adapted to advance the film in the negative film gate step by step and the film in the positive film gate one step at each alternate step of the other film.

7. In a photographic printing apparatus for the purpose described, the combination of a negative film gate, a projection lens to receive light from a film in said film gate, a light-splitting device to receive and divide the light from the lens, a positive film gate behind the light-splitting device, mirrors to receive light from the splitting device and reflect the same to the opposite sides of a film in the positive film gate, and means for feeding the films step by step through the film gates.

8. In a photographic printing apparatus for the purpose described, the combination of a negative film gate, a lens to receive light from a film in said film gate, a light-splitting device behind the lens to divide the light therefrom, means for rotatably adjusting the splitting device about an axis thereof, a positive film gate behind the splitting device, reflectors rotatably adjustable on axes in a plane at right angles to the said axis of the splitting device to reflect the light from the splitting device to a film in the positive film gate, and means for feeding the films step by step through the film gates.

9. In a photographic printing apparatus for the purpose described, the combination of a negative film gate; a projection lens to receive light from a film in said film gate; a light-splitting device behind the lens to receive and divide the light received therefrom and provided with a surface arranged at an angle to the axis of the lens, said surface having light-reflecting and light-transmitting areas; a positive film gate behind the splitting device, mirrors behind the splitting device to receive light therefrom and reflect the same to opposite sides of a film in the positive film gate; and means for feeding the films step by step through the film gates.

10. In a photographic printing apparatus for the purpose described, the combination of a negative film gate; a projection lens to receive light from a film in the said film gate; a light-splitting device behind the lens; a rotatably adjustable mirror behind the splitting device to reflect light therefrom to one side of a film in the positive film gate; reflecting means behind the splitting device to receive light therefrom and reflect the same to the other side of the film in the positive film gate; and means for feeding the films step by step through the film gates.

11. In a photographic printing apparatus for the purpose described, the combination of a negative film gate; a projection lens to receive light from a film in the negative film gate; a positive film gate behind the lens; devices for reflecting light from the lens to the opposite sides of a film in the positive film gate; means for feeding the films step by step through the film gates; and means for protecting from light both sides of the film in the positive film gate when the film therein is in motion.

12. In a photographic printing apparatus for the purpose described, the combination of positive and negative film gates, a projection lens to receive printing light from a film in the negative film gate, means for reflecting light from the lens to the opposite sides of a film in the positive film gate, mechanism for feeding the films step by step through the film gates, and means connected with the feeding mechanism to operate in harmony therewith for exposing the film in the positive film gate to printing light only when the films are at rest.

13. In a photographic printing apparatus for the purpose described, the combination of positive and negative film gates, a projection lens between the film gates to receive light from a film in the negative film gate, means for reflecting light from the lens to the opposite sides of a film in the positive film gate, mechanism for feeding the films step by step through the film-gates, shutters working on opposite sides of the positive film gate to expose and obscure the film therein, and means for actuating the shutters, connected with the said feeding mechanism for operation in harmony therewith to expose the film in the positive film gate only when the films are at rest.

14. In a photographic printing apparatus for the purpose described, the combination of positive and negative film gates, optical means to project successive images from a film in the negative film gate upon opposite sides of a film in the positive film gate and in suitable registry with each other, and mechanism for advancing the films step by step through the film gates.

15. In a photographic printing apparatus for the purpose described, the combination of positive and negative film gates; optical means, including a plurality of reflectors, for projecting upon opposite sides of a film in the positive film gate and in suitable registry with each other successive images upon a film in the negative film gate; step-by-step film-feeding mechanism to advance the films through the film gates and adapted to advance the film in the negative film gate at a faster rate than the film in the other; means to illuminate the film in the negative film gate; and means to expose the film in the positive film gate only while both films are at rest.

16. In a photographic printing apparatus for the purpose described, the combination of positive and negative film gates; feeding devices to advance films through the film gates; mechanism for actuating the feeding devices to advance a film in the negative film gate two image-spaces to one image-space of the film in the other film gate; optical means to project upon opposite sides of the film in the positive film gate, and in suitable registry with each other, successive images from a film in the negative film gate; means to illuminate the film in the negative film gate; and shutter-mechanism operating in harmony with the aforesaid actuating mechanism to permit printing light from the film in the negative film gate to strike the other film only while the films are at rest.

In testimony whereof I have hereunto affixed my signature.

PERCY DOUGLAS BREWSTER.